United States Patent [19]
Johnson et al.

[11] Patent Number: 5,644,764
[45] Date of Patent: Jul. 1, 1997

[54] METHOD FOR SUPPORTING OBJECT MODELING IN A REPOSITORY

[75] Inventors: Peter Johnson, Foothill Ranch; Sridhar Srinivasa Iyengar, Irvine, both of Calif.

[73] Assignee: Unisys Corporation, Blue Bell, Pa.

[21] Appl. No.: 382,303

[22] Filed: Jan. 31, 1995

[51] Int. Cl.$^6$ .......................... G06F 17/30; G06F 12/00
[52] U.S. Cl. .......................... 395/614; 395/611; 395/619
[58] Field of Search .......................... 395/600, 650

[56] References Cited

U.S. PATENT DOCUMENTS

| | | | |
|---|---|---|---|
| 5,412,774 | 5/1995 | Agrawal et al. | 395/157 |
| 5,432,932 | 7/1995 | Chen et al. | 395/650 |
| 5,497,491 | 3/1996 | Mitchell et al. | 395/700 |
| 5,553,282 | 9/1996 | Parrish et al. | 395/600 |

*Primary Examiner*—Thomas G. Black
*Assistant Examiner*—Cheryl Lewis
*Attorney, Agent, or Firm*—J. Ronald Richebourg; Mark T. Starr; Steven R. Petersen

[57] ABSTRACT

In a computer system having a user interface, a memory, a repository and a database, a repository program operating in the computer system for accessing the database, the repository program executing a method for supporting modeling, the method comprising the steps of examining a collection of types forming a model; sorting object types into data and persistent type objects; creating all data type objects and adding to a collection of all objects owned by the model; creating all persistent type objects and adding to a collection of all objects owned by the model; initializing all persistent type objects in the collection of objects.

7 Claims, 7 Drawing Sheets

METHOD FOR SUPPORTING OBJECT MODELING IN A REPOSITORY

FIELD OF THE INVENTION

The present invention relates in general to the field of repository databases and in particular to a method for supporting object modeling in a repository.

BACKGROUND OF THE INVENTION

The storage and manipulation of data records or objects within a database application is well known in the prior art. A database allows one to store information in it; and it does not necessarily have any special meaning associated with the things that are stored in the database. A repository not only uses the database as a data store, but it is a layer above a database. A repository has information about the things stored in the database. Stated otherwise, a repository is like a card catalog that is found in the library, with the library being analogous to a database.

With the advent of repositories, improvements in the accessibility of data within databases has improved. However, as these repositories have become larger and more complex a method is required to support object modeling in a repository.

BRIEF SUMMARY OF THE INVENTION

It is therefore an object of the present invention to provide an improved repository system.

It is another object of the present invention to provide an improved repository which supports object modeling.

The method of the present invention is useful in a computer system having a user interface, a memory, a repository and a database. The method is a repository program executed by the computer system.

DETAILED DESCRIPTION

Before proceeding with a detailed description of the method of the present invention a background discussion of repositories in which the present invention is useful would be helpful. In general, a repository enables the user to store, manage, share and reuse information about the information system in which the repository is used. The repository enables the user to store more than just the data that is processed by an information system. For example, definition data stored in the repository may be information about the development of applications; including descriptions of data, programs and system objects. It may also include information about relationships among data, programs and system objects; as well as the semantics and use of the information.

Examples of definition information might include the files and programs that form a salary administration application. This application might define the minimum and maximum salaries at a given level. Another example is management information used to manage and maintain definition information. Management information also describes who can use definition information and when, where and why the information is used. For example, the salary administration application might be accessible only to a select group of repository users.

Yet another example is operational information about the environment in which the user operates. Examples of this information include system configuration, backup information and schedules.

Figure 1:
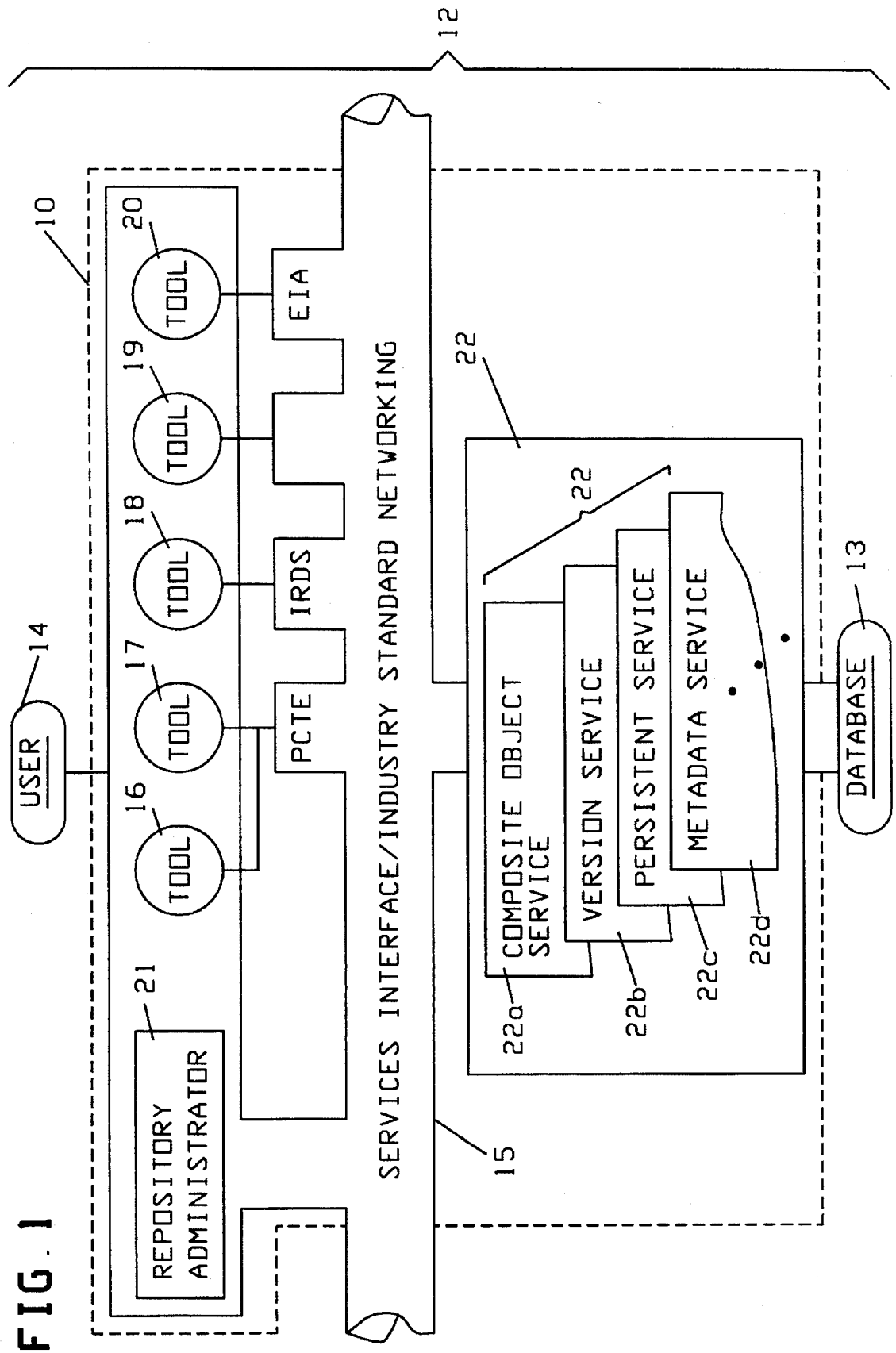
FIG. 1 is a block diagram of a computer system showing the various components of hardware and software that support a repository employing the method of the present invention.

Referring now to the drawings and FIG. 1 in particular, a block diagram is shown of a computer system 12 including a repository 10 that may use the method of the present invention. The repository 10 is illustrated as being supported by an information system 12 having a user interface 14. Tools 16–20 (such as CASE tools), which are integrated within the repository 10, are coupled to a services interface 15. The tools 16 and 17 are coupled to the interface 15 by means of an interface agent identified as Portable Common Tool Environment ("PCTE"), tool 18 is coupled to the interface 15 by means of an Information Resource System Dictionary ("IRDS") and tool 20 is coupled to the interface by means of an Electronic Industry Associates ("EIA") interface agent. The point here is to illustrate the flexibility of use of a variety of tools and interface agents with the repository 10.

An administrator 21 manages the repository 10, the database 13 and the environment around the repository. The administrator 21 is typically a work station that can manage a single repository or a network of repositories.

A service library 22 provides the functionality that enables the user to store, manage and reuse repository information. Examples of services within the library 22 are Composite Object Service 22a, which is disclosed in a copending patent application Ser. No. 08/381,574, filed Jan. 31, 1995, assigned to the assignee of this application and entitled IN AN OBJECT ORIENTED REPOSITORY, A METHOD OF TREATING A GROUP OF OBJECTS AS A SINGLE OBJECT; and Version Service 22b, which is disclosed in a copending patent application Ser. No. 08/381,580, filed Jan. 31, 1995, also assigned to the assignee of this application and entitled A METHOD FOR MAINTAINING A HISTORY OF SYSTEM DATA AND PROCESSES FOR AN ENTERPRISE. Another library service, Persistent Service 22c, deals with definition, tracking and maintenance of objects that continue to exist beyond the execution of a particular tool or of the repository itself. Yet another library service, MetaData Service 22d, is the subject of this application. It is noted that many more types of library services may form a part of such a repository, the details of which are beyond the scope of this disclosure.

The repository 10 employing the present invention provides a client/server architecture in which clients, i.e. tools 16–20, request services from the server, i.e. the repository 10 and its service library 22. In return the repository 10 and its service library 22 respond to requests from client tools 16–20. A repository client is software that accesses or modifies information that is maintained by the repository. The repository client uses the service library 22 (i.e., the server), which includes software integrated into the repository to manage repository information and provide services to users of that information. It is noted that software in the repository can act both as a repository client when the software is requesting a service from some other repository software and as a repository server when the software is providing a service to some other repository software.

It is pointed out that a SPARC system manufactured by Sun Microsystems, Inc. of Mountain View, Calif., was used for executing one embodiment of the method of the present invention, which method was written in C++ programming language.

As a repository user, one can access the information in the repository through the tools 16–20 that have been integrated within the repository. In the context of a repository, a "tool" is any application software that creates, modifies or uses information in the repository. Tools primarily use the repository for sharing information with other tools and tool users. For example, a COBOL compiler and a user-interface tool can share the definition of a data structure. Tools also benefit from using the repository services that provide features such as a version control and network distribution. A wide variety of tools serving many diverse purposes can use a repository. A catalog of such tools includes integrated computer-aided software engineering (CASE) and fourth generation language (4GL) tools, enterprise modeling tools, analysis and design specification tools, project planning tools, word processors, graphics tools, source code editors, compilers, linkers, de-buggers, etc.

The repository service library 22 provides the functionality that enables the user to store, manage and reuse repository information. The present invention deals with that service referred to herein as metadata services. The metadata service enables a user to define object-modeling constructs such as objects, types, attributes, relationships, operations and integrity rules. It also allows the user to extend the repository information model such that one can integrate new tools with the repository and define new types of repository objects, such as data flow diagrams and project schedules. It also allows reuse of object types and operations that are defined in the repository. Moreover, it allows the extension of repository functionality by defining subtypes and by overriding inherited operations to refine their behavior in the subtypes.

The method of the present invention provides a mechanism for representing a concept that is too large or complex to describe as a single entity through the use of modeling. Instead, a model represents the concept as a set of components and the relationships between these components. Models are abstractions of real-world concepts such as ideas, objects or systems. Typically, models are used to describe, design and document systems such as a reservation system for an airline, a banking system or a patient-information system for a hospital. Information models represent the information processed or managed by enterprises. An information model represents an enterprise as a set of related components, called types, and the relationships among the types. The types provide templates defining the structure of the information and the services provided by the model. The information model of the present invention defines information that can be stored in the repository. It also identifies the services provided by the repository and the tool and technology models supported thereby.

Repository information models define information stored in repositories and identify the repository functionality. The types defined for a repository model provide a common structure for information in a repository. This feature enables tools interfacing with the repository to share and reuse repository information.

The method of the present invention is one of the libraries of the repository and sometimes is referred to herein as metadata service. The metadata service provides the mechanisms that enable the user to perform the following tasks:

Define object-modeling constructs such as objects, types, attributes, relationships, operations, and integrity rules;

Extend the repository model to integrate new tools with the repository and define new types of repository objects, such as data flow diagrams and project schedules;

Reuse object types and operations that are defined in the repository; and,

Extend repository functionality by defining subtypes and by overriding inherited operations to refine their behavior.

At this Juncture of the description several additional definitions are helpful.

TYPES

A type is a template that describes a set of features—the state and behavior—that an object or another type can possess. A type defines a pattern that can be used to create or identify objects; it does not contain the actual object. A model is defined by a hierarchy of types.

Most types define the structure of repository objects as the features the objects can have. Data types define the values associated with the features. (Data types are also known as primitive types.) For example, data types are used to define attribute values, operation parameters, and operation return values.

The values represented by the data types do not exist as separate objects in the repository. Instead, they are always sorted as part of a repository object.

Persistent types define objects that continue to exist within the repository beyond the execution of a particular tool or of the repository. These persistent objects are essentially permanent—they remain in the repository until they are explicitly deleted by users. The majority of repository types are persistent.

A transient type defines a temporary object that will be automatically deleted when the function or program in which the object was created exists or terminates. Transient types are provided in the model to support exchange of data between an application and the repository.

A type that can be used to define other types and objects is said to be instantiable. Objects derived from a type are called instances of that type. Types derived from a type are called subtypes of that type. Instances and subtypes of a type inherit the features—attributes, references, and operations—defined for that type. The repository User type is an example of an instantiable type. A type that is used to define only other types and not objects is said to be abstract.

A type that is derived from one or more other types is called a subtype. The definition of a subtype identifies the type or types from which it is derived. A type from which a subtype is derived is called the supertype. The definition of a supertype identifies the subtypes derived from it. A type cannot be a supertype or a subtype of itself. A subtype inherits all the features of its supertype. It can be customized by adding new features. The structure created by deriving types from other types is called a hierarchy. The hierarchy shows the relationship of the supertypes and subtypes.

A hierarchy has a single base type. The base type is the highest supertype in the hierarchy.

In addition to features defined specifically for a subtype, each subtype acquires the features defined for the supertype. This trait is called inheritance. For example, managers have all of the features defined in Manager, and they inherit all of the features of Employee as well. Hence, if the Employee type has a feature such as name, we can ask for the name of a manager since Manager is a subtype of Employee.

FEATURES

A feature defines some element of either the state or the behavior that objects can possess. A feature is defined for a type, but applied to the corresponding objects. The repository has two kinds of features: operations and properties. For example, the Employee type might define the features name, birthDate, salary, and setSalary. Each employee object is subsequently considered to possess these features. That is, each employee has a name, a birth date, and salary. The employee's salary can be modified by using the setSalary feature.

There are two basic categories of features: properties and operations. Properties define state. For example, the salary feature is a property that defines an employee's current salary. Operations define behavior. For example, the setSalary feature is an operation that defines the mechanism for changing an employee's salary.

PROPERTIES

A property is a feature that represents a state that objects can possess. (In some models, properties are called instance variables.) A property can represent either a single value or a set of values. Properties are further divided into attributes, whose values are embedded within the owning objects, and references, whose values are independent objects.

The repository supports the following kinds of properties:
Attribute
A property for which the value is embedded within the owning object. For example, an employee's social security number can be defined as an attribute whose value is stored as a string within the employee object.
Reference
A property for which the value is maintained outside the owning object. For example, the employee's manager can be defined as a reference that identifies a separate employee object that represents the manager.

Every property has a domain that identifies the objects that the value of the property can hold. The domain is defined as a type. Objects that are instances of the type are legal values for the property. For example, the domain of the boss property of the Employee type might be specified as the Manager type. Therefore, only a manager object can be designated as the boss of an employee.

When an object is first created, none of its properties have values until they are implicitly assigned a default value or explicitly assigned a value by the construct operation. Until a property has a value it is considered undefined. For properties that are references, the value is considered null. The state of being null is not having a value for itself. Rather, it means that no value exists.

A property for which the value is embedded within the owning object is called an attribute. Such a property typically is used for simple values that are not shared between multiple owning objects. For example, the Employee property birthDate is simply a Date object—that is, the domain of the birthDate property is the Date type. If one employee's birthDate property is changed, the change does not affect other employees whose birthDate property is the same date. Consequently, each employee object should use a "private" date object that is embedded within it—that is, as an attribute.

A property for which the value is maintained outside the owning object is called a reference. For a reference, the owning object points to the value object. One reason for defining a property as a reference is to allow object sharing. A reference enables two or more owning objects to have the same value for a property. All owning objects can point to the same value object. For example, if two employees have the same manager as a boss, they share the same manager object. Consequently, any changes to the manager (such as changing his or her name) are reflected when the boss reference is accessed for all employees that have that boss.

A property that has one value for each object is said to be single valued. For example, each employee has one name and one birth date. A property that has more than one value for each object is said to be multi-valued. For example, each manager manages multiple employees, so the staff property for a manager object must be able to reference multiple values. A multi-valued property is defined by specifying a collection as its domain. A collection represents a set of values. A collection provides the ability to count the values defined for a multi-valued property, to add new values to the property, and to delete existing values.

The repository supports several types of collections, each of which organizes elements in a different manner. This capability enables the user to:

Store and retrieve the elements in a special order; and,

Search for elements in a special way.

The collection types supported by the repository are summarized in the following table:

| Type | Description |
| --- | --- |
| Array | Creates a dynamic array of objects in which an integer index can be used to access array members. An array can contain duplicate objects. |
| List | Creates an ordered collection of objects. A list can contain duplicate objects. |
| Set | Creates an unordered collection of objects. Objects in a set must be unique. |

OPERATIONS

An operation is a feature that represents a behavior that objects can possess. An operation can be thought of as a function: it has a name, an optional set of parameters, and an optional return type. Like properties, operations are applied to each object within the owning type. Consequently, an operation is generally invoked in the context of a specific object.

An operation can have parameters that identify information a caller must provide when invoking the operation.

If an operation has no parameters, a caller merely invokes the operation for the desired object. For example, consider the following features:

| Type | Feature | Domain/Return Type |
|---|---|---|
| Employee | birthDate (attribute) | Date |
| | age (operation) | Integer |

As shown, the birthDate attribute has a domain of Date. Age is an operation (with no parameters) whose return type is Integer. The purpose of age is to compute an employee's current age (in years) from his or her birth date. Because the age operation is invoked for a specific employee, it is able to obtain the value of that employee's birthDate attribute, make the necessary computation, and return the appropriate integer without requiring parameters.

When an operation has parameters, each parameter has semantics similar to those of properties. Each parameter has a name, a domain type, and a set of options that can be used to affect the behavior of the parameter. The following table shows an example of an operation, defined for the Employee type, that has parameters:

| Operation | Parameter | Parameter Domain | Parameter Options |
|---|---|---|---|
| setSalary | amount | Real | REQUIRED |
| | authorizedBy | Manager | REQUIRED |
| | effective | Date | DEFAULT today's date |

The setSalary operation has three parameters:

The amount parameter is a Real number (floating-point) that is required. Therefore, the caller must specify a value for this parameter.

The authorizedBy parameter is a Manager object that also is required.

The effective parameter is a date parameter that is not required. However, if the caller does not specify a value for this parameter, the current system date is used by default.

A multi-valued parameter is a set, or collection, of values. Such a parameter is useful when the operation must operate on several objects even though it is invoked in the context of a single object. An operation optionally can return an object when it completes processing, just as a program function can return a value. An operation that returns an object is called typed because it has a return type specified. An operation that does not return an object is called un-typed because it does not have a return type specified. A return type must be one of the types recognized by the repository. An operation can return a set of objects by specifying a collection as its return type.

An operation can be defined for a type and then redefined for each subtype of the original type. This process is called overriding an operation.

When an operation is overridden, a subtype that inherits the operation has a separate method that redefines the functionality of that operation. The technique that the repository uses to choose which method to call for a given operation is called dynamic binding.

Dynamic binding (also called polymorphism) means that the repository chooses the method that is most specific for a given object and operation. The most specific method is the one defined in the lowest subtype of which the object is an instance.

For example, assume setSalary is an operation defined for the Employee type. An employee object can be an instance of the Employee type or one of its subtypes.

If you call the setSalary operation for an object that is an Employee instance, the repository selects the method associated with the setSalary operation defined for the employee type.

If you call the setSalary operation for an object that is a Manager instance, the repository selects the method associated with the setSalary operation as it is redefined for the Manager type. If the Manager type does not redefine the setSalary operation, the repository selects the method associated with the setSalary operation defined for the Employee type as the immediate supertype of the Manager type.

You can define an operation to be called with different sets of parameters. For example, you might define the setSalary operation to be called with only an amount parameter or with both an amount parameter and an effectiveDate parameter.

Each combination of parameters that an operation can accept is called a signature. To define multiple signatures for an operation, you define the operation more than once in the same owner type and use the desired signature for each definition.

METHODS

The operations defined for a model form an interface that can be seen by a caller. Separate from this definition, each operation must be implemented by a module of code called a method. Methods are typically written as separate functions and bound into a set of code libraries. The method code library name for each operation is then identified to the repository as part of the definition of the operation.

When a caller invokes an operation, the request is received by the repository, which finds and calls the appropriate method. The operation passes to the method the appropriate parameters. When a method is called, it can then act as a caller and call back into the repository to invoke other operations. Consequently, a method can be thought of as a specialized kind of application program.

OBJECTS

An object is an abstract representation of a real-world concept or thing—such as a person, a software package, or an event—that is stored in the repository. In the repository, the state of an object is represented by the values of the properties defined for the type. For example, the state of an integer is its numeric value. The state of a person is its name, birthDate, spouse and so on.

The behavior of an object is the set of functions that the object can perform. In the repository, the behavior of an object is represented by the operations defined for the owner type. A characteristic of object behavior is the ability to return some of its state to a requester. For example, the object person can return its name. For this reason, some object models describe object behavior as the set of messages that an object can receive and respond to. One example of object behavior is the capability an integer has to perform such functions as addition, square root and absolute value.

Figure 2:
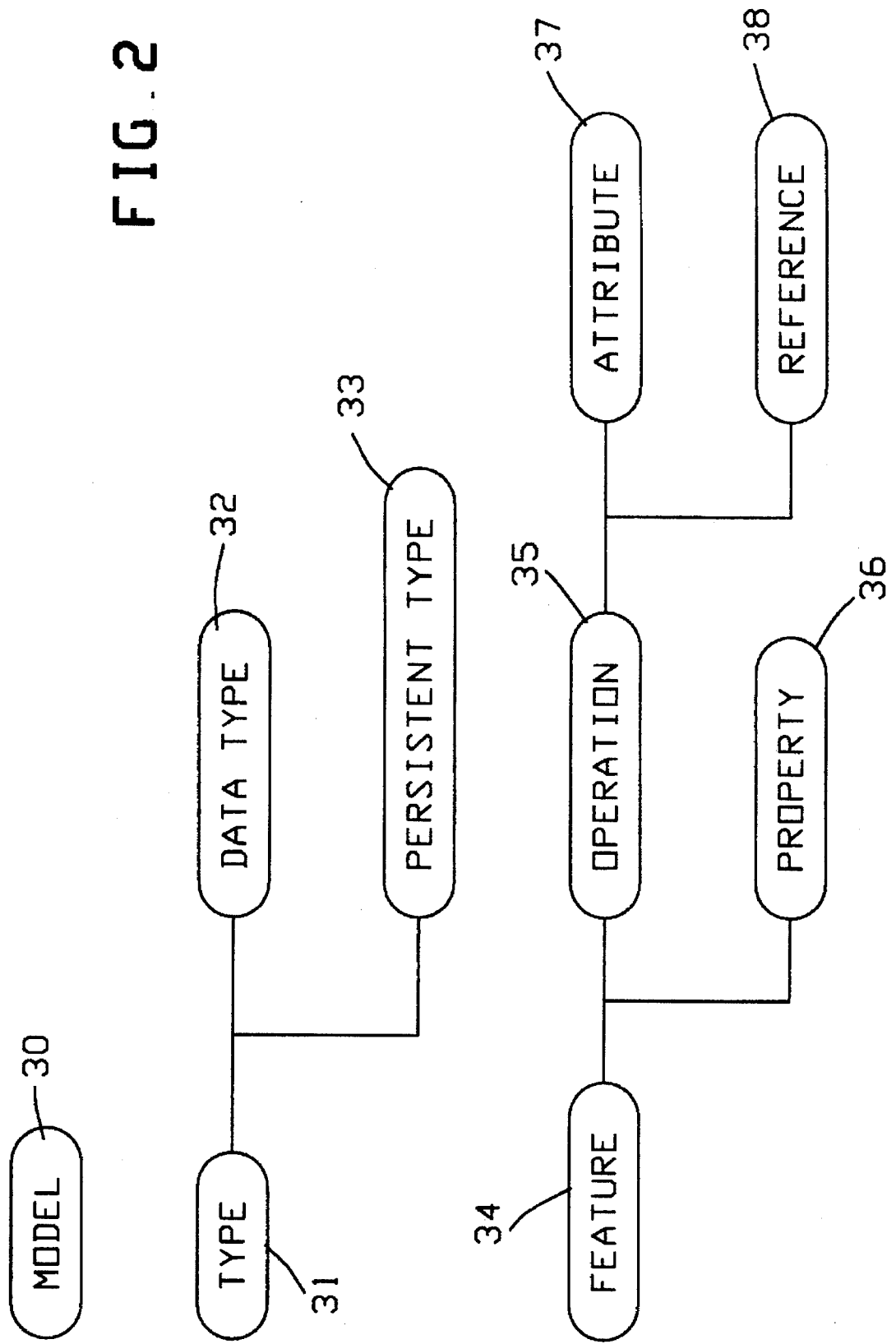
FIG. 2 is an organization chart amplifying the breakdown of elements of a model into types and features, and their constituents.

Specification of a model in the repository depends on the definition of the object types of the metadata. With reference to FIG. 2, the object types of the metadata service are shown. First, there is a model 30 followed by a type 31. A type is a template that describes a set of features (the state and behavior) that an object or another type can possess. A type defines a pattern that can be used to create or identify objects; it does not contain the actual object. A model is defined by a hierarchy of transient data types 32 or persistent object types 33. Next are features 34 which are categorized into operations 35 or properties 36. A feature defines some element of either the state or the behavior that objects can possess. A feature is defined for a type, but applied to the corresponding objects. In other words, a type defines the layout of the data for the objects, and objects are instances of the type. Properties define a state. For example, the salary feature is a property that defines an employee's current salary. Operations define behavior. For example, the setSalary feature is an operation that defines the mechanism for changing an employee's salary. The properties 36 are categorized as attributes 37, whose values are embedded within the owning objects, and references 38, whose values are independent objects.

Example of a Model

Figure 3:
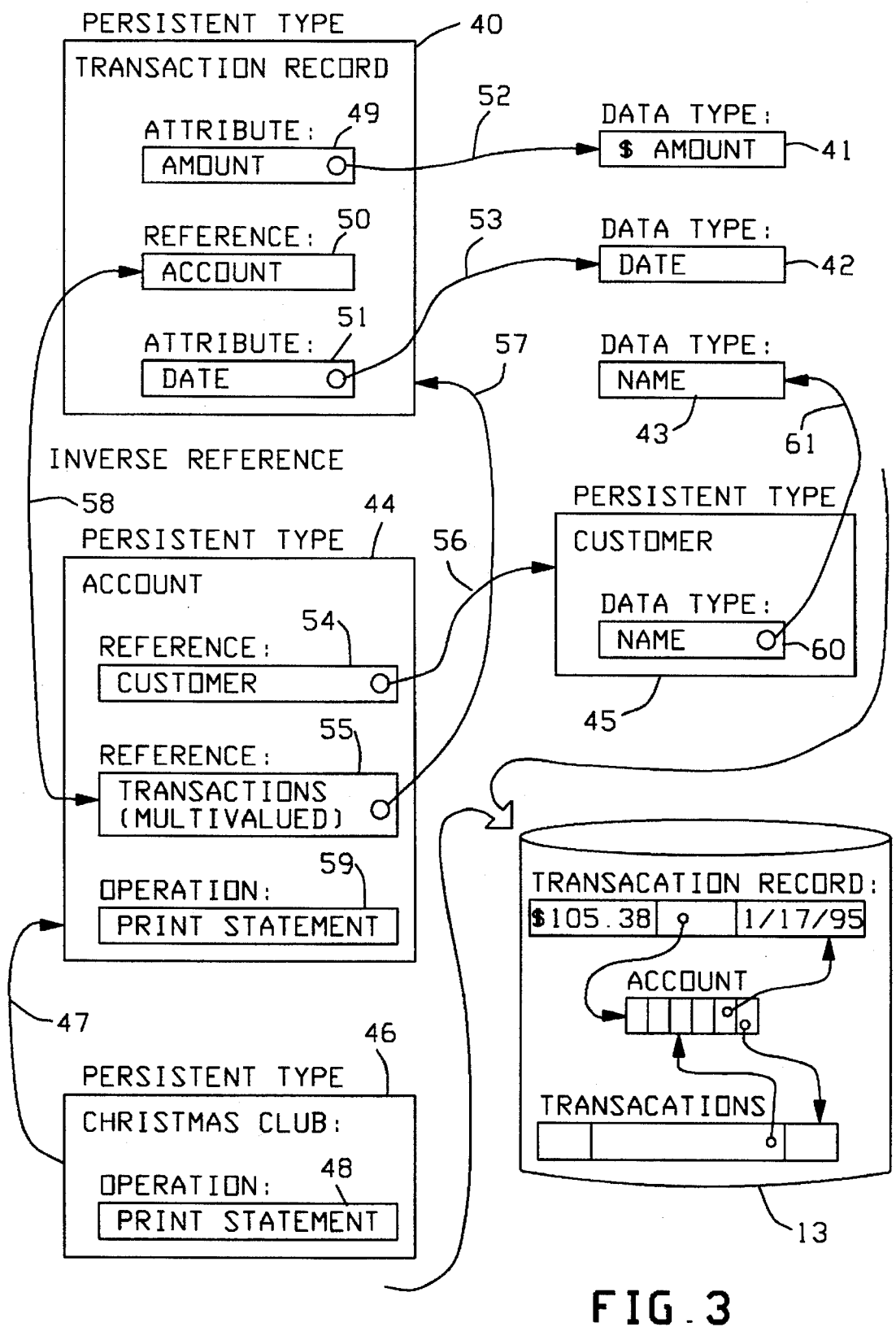
FIG. 3 is a conceptual diagram of a model of a banking system useful in illustrating the method of the present invention.

Referring now to FIG. 3, a conceptual diagram of a model of a banking system is provided for help in illustrating the method of the present invention. To begin with, several types, both data and persistent, are created. For example, a persistent type 40 is created for a Transaction Record. Three data types 41, 42 and 43 are created for $ Amount, Date and Name, respectively. Another persistent type 44 is created for Account. Yet another persistent type 45 is created for Customer. Still another persistent type 46 is set up for a special account such as Christmas Club, which account is a subtype of Account 44 and is linked thereto by a pointer 47. The persistent type 46 includes an operation 48 for execution of a print statement operation.

Within the persistent type 40 for Transaction Record, attributes 49 and 50 are created for Amount and Date, respectively. Also, a reference 51 is established for Account. The attribute 49 for Account is linked to the data type 41 for $ Amount by a pointer 52. In a like manner, attribute 50 for Date is linked to the data type 42 by a pointer 53. These pointers will be explained in greater detail hereinafter. Within the persistent type 44 for Account, references 54 and 55 are created for Customer and Transactions, respectively.

The reference 54 is linked to the persistent type 45 for Customer by a pointer 56; and, the reference 55 is linked to the persistent type 40 by a pointer 57. The reference 55 for Transactions is linked to the reference 50 within Transaction Record by a pointer 58. Inversely, the reference 50 is linked back to the reference 55 by the same pointer 58. Thus, this relationship is referred to herein as an inverse reference. Also within the persistent type 44 an operation 59 is created for Print Statement.

Within the persistent type 45 for Customer, a data type 60 is created for Name. The data type 60 is linked to the data type 43 for Name by a pointer 61.

When a transaction within the banking system takes place the amount thereof is entered into the attribute 49 from the data type 41; and, the date is recorded into the attribute 51 from the data type 42. The Customer name is entered into the reference 54 from the data type 60 within the persistent type 45; and, the amount, the account number and the date of the transaction is entered into the reference 55 from the persistent type 40-Transaction Record. Note that the reference 55 in this model is multivalued since many transaction records will be made for a particular account.

When a statement is to be printed for accounts, then the print statement operation 59 within the persistent type 44 and operation 48 within the persistent type 46 will be executed.

The transaction recorded within the database 13 appears as shown. That is, the dollar amount of the transaction is recorded along with the account number, the date and the transaction.

Description of one Embodiment: Defining a Model

The data stored into the repository is defined by what is known as the information model. Such a model is a collection of models that define the data that will be stored in the repository. The Model is the basic type of the metadata service, and a basic services model is stored in the repository for use as an outline to aid the user. Thus, to create a model the user creates instances of each of the elements of a model (see FIG. 2), as required for the subject being modeled (see FIG. 3 for the subject of banking). Each Model defined in the repository consists of one or more Types. Each Persistent Type declared in a model is defined as containing one or more Features. The Features of a Persistent Type define the state (Property) as well as the behavior (Operation) of the type. An Attribute represents a basic data value of an object. For example, if one object represents an employee, the date the employee was hired is an attribute of the employee type. A Reference links one object to another object. For example, if one object represents an employee and another object represents a task, the task being worked on by the employee is a reference of the employee type.

To define a model the user creates and relates instances of the repository MetaModel, MetaType and repository MetaFeature types. That is, the MetaType instance represents the structure, while the MetaFeature instance represents the interface and functionality of the model. The order in which the user defines a model and its components is as follows:

1. Create the model;
2. Create the types that the model contains; and
3. Define the features for each type.

For defining a model in the repository, the user constructs the operation of an instance of the MetaModel type. This instance represents the model in the repository. Once the user has established a new model in the repository, then the structure of that model is defined by defining the types that are part of the model. Note that a type can be used in only one model, which restriction is necessary in order to avoid confusion.

To define a feature for a type, the user employs the construct operation to create an instance of one of the following repository MetaFeature subtypes:

Repository MetaAttribute type
    An instance of this type represents a data-valued property of the type.

Repository MetaReference type
    An instance of this type represents an object-valued property of the type.

Repository MetaOperation type
    An instance of this type represents an operation of the type.

In defining a property the user must define both an attribute and a reference. To define an attribute the user employs the construct operation to create an instance of the MetaAttribute type. This instance contains the following information:

The name of the attribute;
The data type of the attribute value;
The attribute value is an instance of one of the subtypes of the repository MetaDataType type; and
Any constraints of the attribute, such as required or unique.

To define a reference the user employs the construct operation to create an instance of the repository MetaReference. This instance contains the following information:

The name of the reference;

The instance of the repository MetaClass type that describes the kind of object which the reference value represents;

Any constraints on the reference, such as required or unique; and

The name of the inverse reference for this reference.

To define an operation for a type the user employs the construct operation to create an instance of the repository MetaOperation type. This instance contains the following information:

The name of the operation;

A reference to the repository Method instance that describes the processing the operation performs;

A list of the repository Parameter type that represent the types of the objects that must be provided to the operation by the caller.

The metadata service of the present invention enables the user to define relationships among objects in a model. The metadata service supports the following kinds of relationships:

Inheritance
Reference
Composite
Dependent

Inheritance relationships are defined through the superclass and subclass properties of the repository MetaClass type. Reference, composite and dependent relationships are defined through the composite and dependent properties of the repository MetaReference type. In defining a value type for a relationship, the user must indicate a value type for the relationship. Only objects of that value type, or one of its subtypes, can be included in that relationship. In defining an inheritance relationship, also known as a generalization or specialization relationship, the user designates superclasses and subclasses within the instance of the repository MetaClass type. A type inherits the characteristics of the superclass and passes characteristics to its subclasses. The metadata service of the present invention supports both single inheritance and multiple inheritance.

In defining a composition relationship, also known as a whole-part or parts of relationships, the user sets the composite property to true, and declares the inverse relationship of the destination object to the source object as a reference relationship. The semantics of a composition relationship determine how an object is versioned and its components are handled.

A dependent relationship indicates that the existence of one or more objects is dependent on another object. To define such a relationship the user sets the composite property to TRUE. This relationship is also referred to as an existence constraint because the dependent object exists only if the source object exists. The metadata service enables the user to define several variations of dependent relationships that have different semantics:

1. A destination object is owned exclusively by a source object. In this scenario, the destination object belongs to the source object and cannot be shared with any other source objects. This type of dependent relationship is created by defining the relationship of the source object to the destination object as a dependent relationship; declaring the inverse relationship of the destination object to the source object as a reference relationship; and, making the inverse relationship single-valued and required.

2. A destination object can be shared among other objects. In this scenario, several source objects can have dependent relationships with a single destination object. This type of dependent relationship is created by defining the relationship of the source object to the destination object as a dependent relationship; declaring the inverse relationship of the destination object to the source object as a reference relationship; and, making the inverse relationship multi-valued and required. It should be noted that a destination object can exist without any source object. In this scenario, a destination object does not require a source object. This type of dependent relationship is created by defining the relationship of the source object to the destination object as a dependent relationship; declaring the inverse relationship of the destination object to the source object as a reference relationship; and, making the inverse relationship either single valued or multi-valued and not required.

Figure 4:
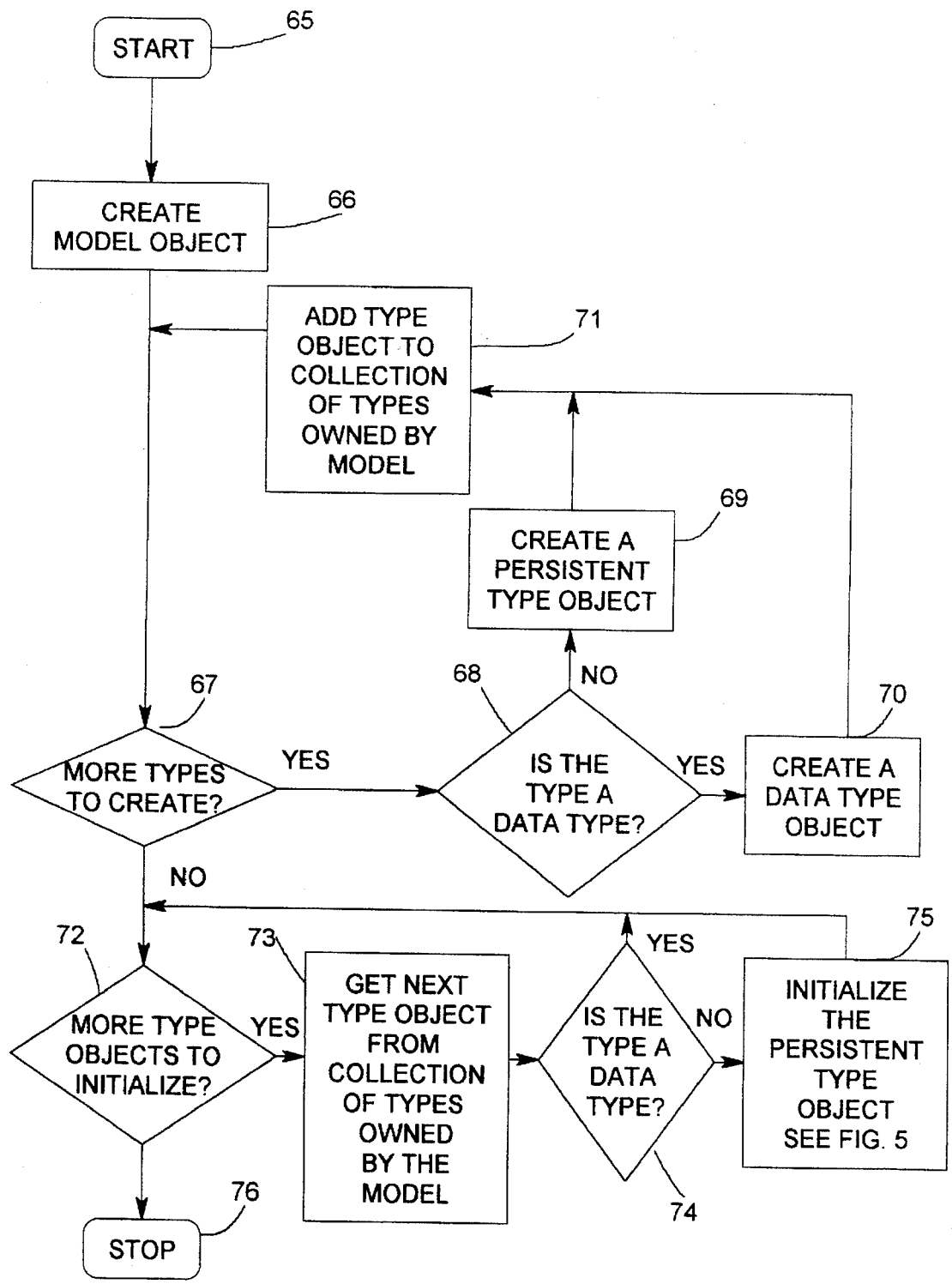
FIG. 4 is a flow chart illustrating the creation of a model object.

Referring now to FIG. 4, a flow chart illustrating the process steps for creating a model object is shown. From a start bubble 65 the first process step is to create a model object to represent the model in the repository, which is depicted by a block 66. A model consists of a collection of types and a type object is to be created for each type, all within a text file. An examination is made of the text file retrieved for each and every type that belongs to the same model. It is pointed out that each type includes an identification of the model to which it belongs. Thus, an inquiry is made as to whether or not there are more types in the text file to create (decision diamond 67). If the answer is YES, then a branch is taken to another inquiry as to whether or not this type is a data type (decision diamond 68), since the specific type object created depends on whether the type is a data type or a persistent type. If the answer from decision diamond 68 is NO, then it must be a persistent type since there are only two model types: data and persistent. A persistent type object is created to represent the persistent type in the repository as depicted by the process block 69; and if the type is a data type then a data type object is created to represent the data type in the repository as depicted by the process block 70. Finally, the type objects (both persistent and data) are added to a collection of types owned by the model (process block 71).

Once all of the type objects have been created, we must go through the collection of type objects a second time to properly set up (i.e., initialize) the persistent type objects. With reference again to the decision diamond 67, if there are no more types to create then a branch is taken to yet another inquiry as to whether or not there are more objects to initialize (decision diamond 72). If the answer is YES then a branch is taken to a process block 73 depicting the obtaining of the next type object from the collection of types owned by the model (block 71). Next, an inquiry is made as to whether or not the type object is a data type, decision diamond 74. If the type object owned is a data type object, then nothing is to be done as represented by the YES branch from the diamond 74 returning to the entry to the diamond 72. If the type object is a persistent type object, which is the NO branch from the diamond 74, the persistent type object is initialized (process block 75). After this initializing step a return is made back to the decision diamond 72 for more type objects to initialize. If there are no more, then a branch is taken out of this routine as depicted by a stop bubble 76.

Figure 5:
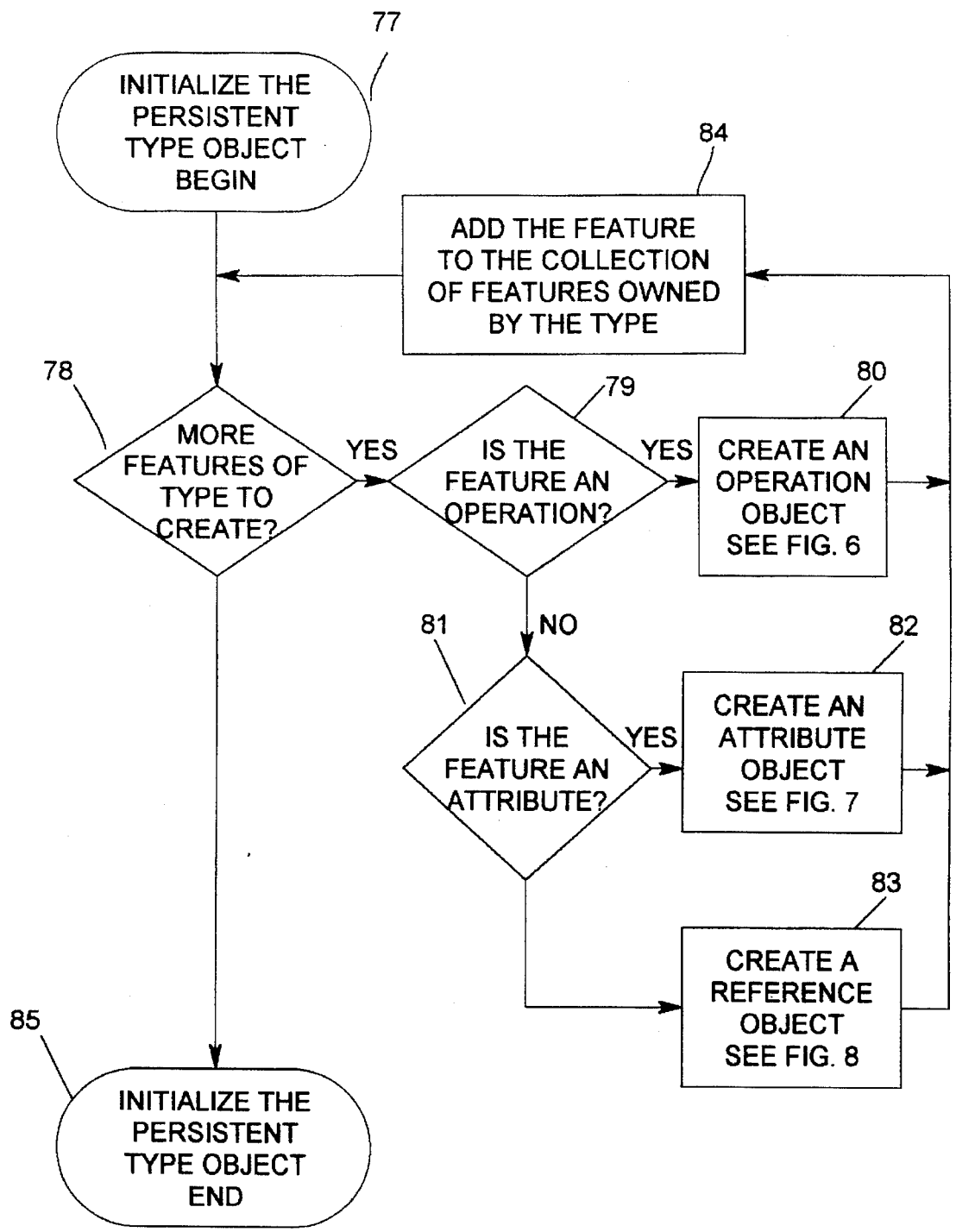
FIG. 5 is a flow chart illustrating how to initialize the persistent type object.

Referring now to FIG. 5, a flow chart amplifying the process block 75 of FIG. 4 is shown. The initializing of the persistent type object begins with bubble 77. A persistent type consists of a collection of features. A feature object must be created for each feature of the persistent type, such as an operation, an attribute or a reference. We begin with an inquiry as to whether or not there are more features of the type to create (decision diamond 78). If yes, then a branch is made to another inquiry (decision diamond 79) as to whether or not the feature is an operation or a property.

With reference briefly back to FIG. 2, note that feature 34, is either an operation 35 or a property 36. Also, a property 36 has both an attribute 37 and a reference 38. If the feature is an operation, then a branch is taken to a process block 80 to create an operation object. The operation object creation process will be explained in greater detail hereinbelow in conjunction with the description of FIG. 6.

If the feature is a property then a branch is taken to another decision diamond 81 to determine if the feature is an attribute. If it is an attribute then a branch is taken to a process block 82 to create an attribute object. The attribute object creation process will be explained in greater detail hereinbelow in conjunction with the description of FIG. 7. If the feature is not an attribute then it must be a reference. Hence, a branch is taken to a process block 83 to create a reference object. The reference object creation process will be explained in greater detail hereinbelow in conjunction with the description of FIG. 8.

Finally, when there are no more features of types to create, as depicted by the NO branch from the decision diamond 78, then an exit is made from the process to initialize the persistent type object as depicted by bubble 85.

Figure 6:
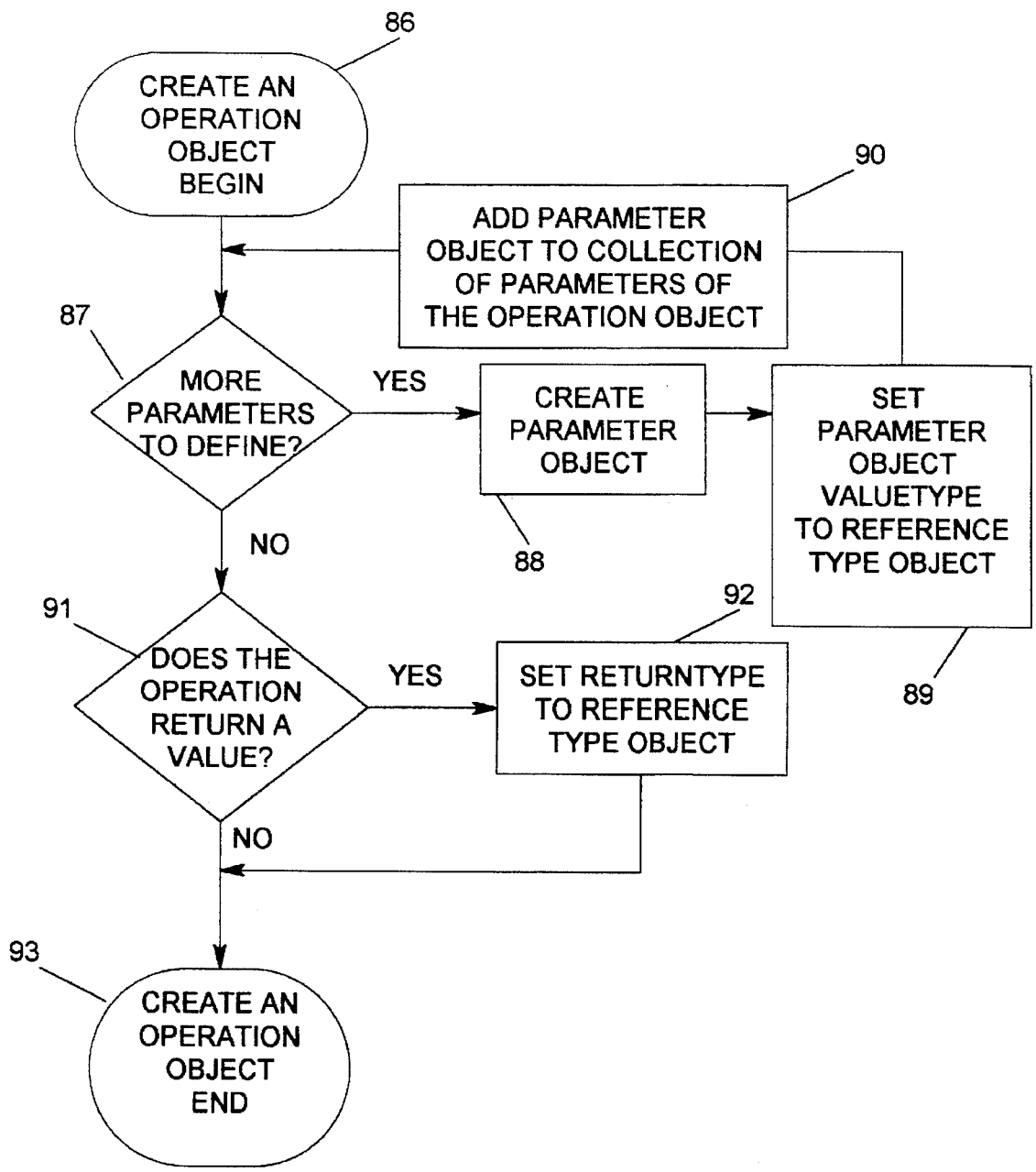
FIG. 6 is a flow chart illustrating how to create an operation object.

Referring now to FIG. 6, a flow chart amplifying the process block 80 of FIG. 5 is illustrated. The creation of an operation object starts with a BEGIN bubble 86. Recall that an operation comprises a collection of parameters, and the text files include all the necessary parameters. Thus, a parameter object must be created in the repository for each parameter defined for the operation. The first inquiry is whether or not there are more parameters to define, as depicted by a decision diamond 87. If the answer is YES, then a parameter object is created to represent the parameter of the operation (process block 88). A parameter object comprises a link to the type object that represents its value type. Hence, the parameter object is linked to the corresponding type object (process block 89). Next, the parameter object is added to a collection of parameters for the operation object (process block 90). Following this operation a return is made to the entry of the decision diamond 87 for retrieval of the next parameter, if any.

Once there are no more parameters to define, as depicted by the NO branch from the diamond 87, then an inquiry is made as to whether or not the operation returns a value as depicted by a decision diamond 91. Note that an operation also consists of an optional link to the type object that represents its return value type. If the operation returns a value (as depicted by the YES branch from the diamond 91), then the return type is set to a reference type object, which is depicted by a process block 92. Following this process step, or if the operation does not return a value, an exit is taken from this routine as depicted by a bubble 93.

Figure 7:
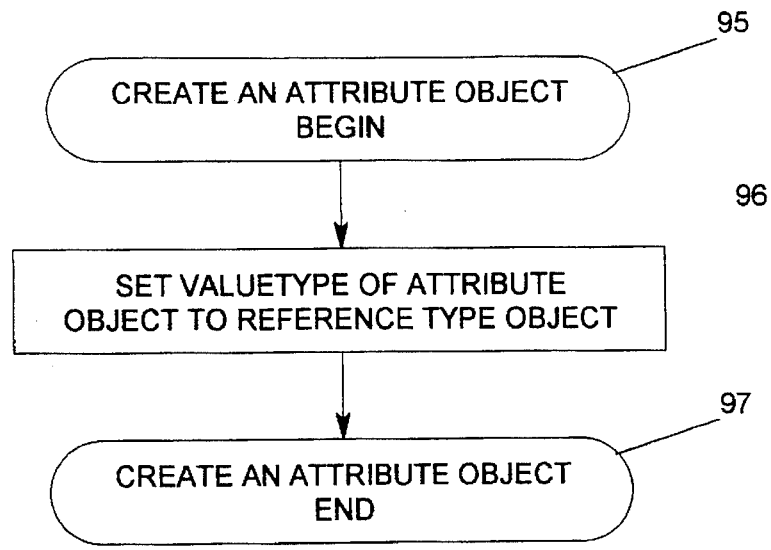
FIG. 7 is a flow chart illustrating how to create an attribute model.

Referring now to FIG. 7, a flow chart amplifying the process block 82 of FIG. 5 is illustrated. The process steps for creating an attribute object starts with a BEGIN bubble 95. Note that an attribute object consists of a link to the data type object that represents its value type. Thus, the attribute object is linked to the corresponding data type object. This process step is depicted by a process block 96, which sets the value Type of attribute to reference type object. Following this step an attribute object is created and an exit is taken from this routine as depicted by a bubble 97.

Figure 8:
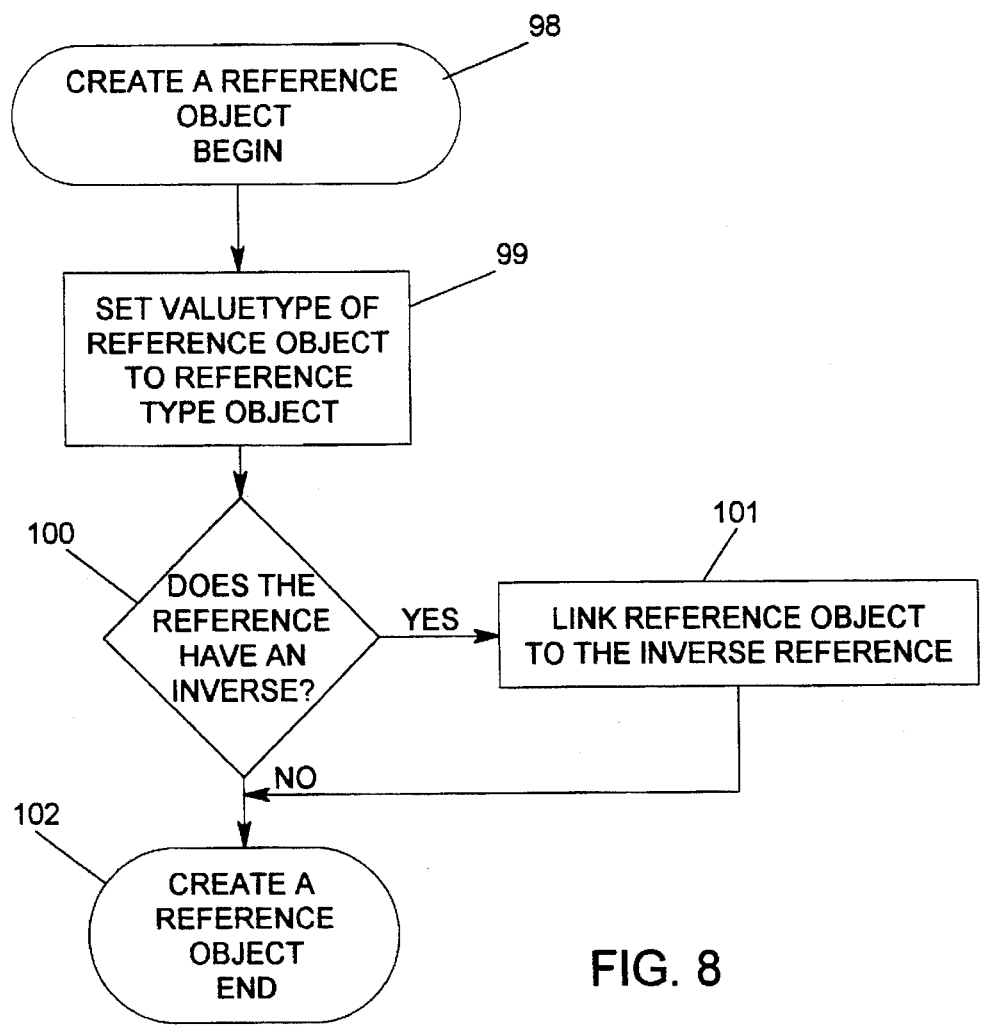
FIG. 8 is a flow chart illustrating how to create a reference object.

Referring now to FIG. 8, a flow chart amplifying the process block 83 of FIG. 5 is illustrated. The process steps for creating a reference object starts with a BEGIN bubble 98. Note that a reference object consists of a link to the persistent type object that represents its value type. Thus, the reference object is linked to the corresponding persistent type object. This process step is depicted by a process block 99, which sets the value Type of reference object to reference type object. A reference is a link from one persistent type to another persistent type. A reference can have an inverse, which is a reference from that other type back to the original type. With brief reference back to FIG. 3, note that the account Reference 55 for Transactions points back to the Transaction Record Reference 50 by means of a pointer 58. A reference and its inverse are maintained automatically by the repository to maintain reference integrity. Therefore, an inquiry is next made as to whether or not the reference has an inverse, which is depicted by a decision diamond 85. If the answer is yes, then the reference object is linked to the inverse reference (process block 101). Following this step, or if the reference does not have an inverse, an exit is taken from this routine as depicted by a bubble 102.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system having a user interface, a memory, a repository and a database, a repository program operating in said computer system for accessing said database, said repository program executing a method for supporting object modeling, said method comprising the steps of:

a. examining a collection of types forming a model stored in said repository;

b. sorting object types into data and persistent type objects;

c. creating all data type objects and adding to a collection of all objects owned by said model;

d. creating all persistent type objects and adding to a collection of all objects owned by said model;

e. initializing all persistent type objects in said collection of objects by;

1) examining each persistent type object in said collection for features thereof;

2) sorting said features into operations, attributes and references;

3) creating an operation type object for all operations sortedby said step of sorting;

4) creating an attribute type object for all attributes sorted by said step of sorting;

5) creating a reference type object for all references sortedby said step of sorting; and, 6) adding all features created into a collection of features owned by said persistent types.

2. The method as in claim 1 wherein said step of creating an operation comprises the steps of:

a. examining a collection of parameters of said operation;

b. creating a parameter object for each parameter examined in said first step;

c. adding each of said parameters to a collection of parameters for an operation; and, d. determining if said operation returns an operation type.

3. In a computer system having a user interface and a database, each being coupled to said system, a repository program operating in said computer system for accessing said database, said repository program executing a method for supporting object modeling, said method comprising the steps of:

a. creating a model object to represent a model in said repository;
   b. for each type of said model determining if an individual one of said types is a data type, and if so;
   c. creating a data type object and adding it to a collection of types owned by said model;
   d. if said individual one of said types is not a data type, creating a persistent type object and adding it to said collection of types owned by said model;
   e. after all types of said model have been processed in accordance with the preceding steps, determining if each type object is to be initialized, and if so;
   f. getting next type object from said collection of types owned by said model;
   g. determining if said next type object is a data type, and if not it must be a persistent type;
   h. initializing each of said persistent type objects; and,
   i. after all type objects have been processed in accordance with steps e through h hereof, stopping said program.

4. A method as in claim 3 wherein said step of initializing said persistent type objects further comprises:

a. determining if there are more features of said persistent type to create, and if yes;
   b. determining if said feature of said persistent type is an operation object, and if so;
   c. creating an operation object and adding it to a collection of features owned by said persistent type;
   d. if said feature of said persistent type is not an operation type, determining if said feature is an attribute, and if so;
   e. creating an attribute object and adding it to said collection of features owned by said persistent type;
   f. if said feature of said persistent type is not an attribute, creating a reference object and adding it to said collection of features owned by said persistent type; and,
   g. when there are no more features of said persistent type to create, stopping initialization of said persistent type and returning to step h of claim 3.

5. A method as in claim 4 wherein said step of creating an operation object further comprises:

a. for each parameter to be defined, creating a parameter object;
   b. setting a value type reference of an individual parameter object to a reference type object;
   c. adding said individual parameter object to a collection of parameters of said operation object;
   d. when there are no more parameters to define, determining if said operation object returns a value, and if so;
   e. setting a value type reference of said operation object to a type object;
   f. if said operation object does not return a value, stopping creation of said operation object and returning to step c of claim 4.

6. A method as in claim 4 wherein said step of creating an attribute object further comprises:

a. setting a value type reference of said attribute object to a data type object; and,
   b. stopping creation of said attribute object and returning to step e of claim 4.

7. A method as in claim 4 wherein said step of creating a reference object further comprises:

a. setting a value type reference of said reference object to a persistent type object;
   b. determining if said reference has an inverse, and if so;
   c. linking said reference object to an inverse reference; and,
   d. if said reference does not have an inverse, stopping creation of said reference object and returning to step f of claim 4.

* * * * *